No. 801,611. PATENTED OCT. 10, 1905.
J. C. SCHOTTLER.
TOOL FOR SMOOTHING GRANITOID.
APPLICATION FILED JAN. 9, 1905.
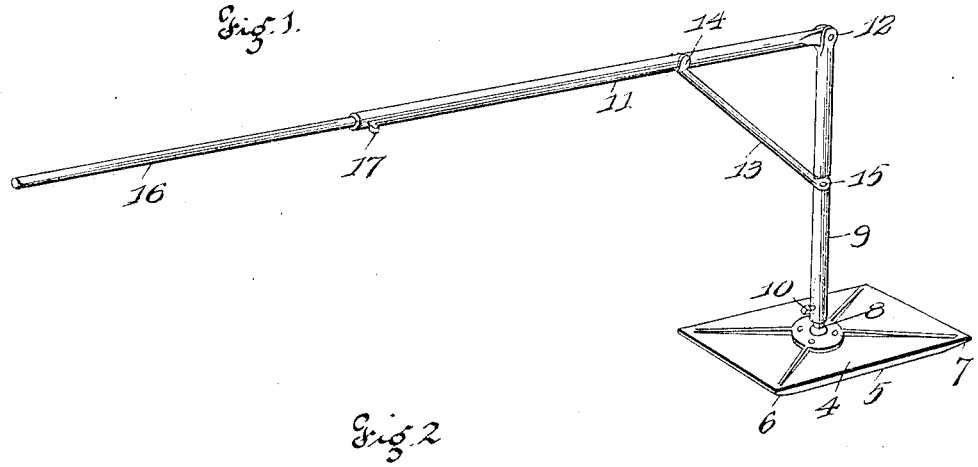
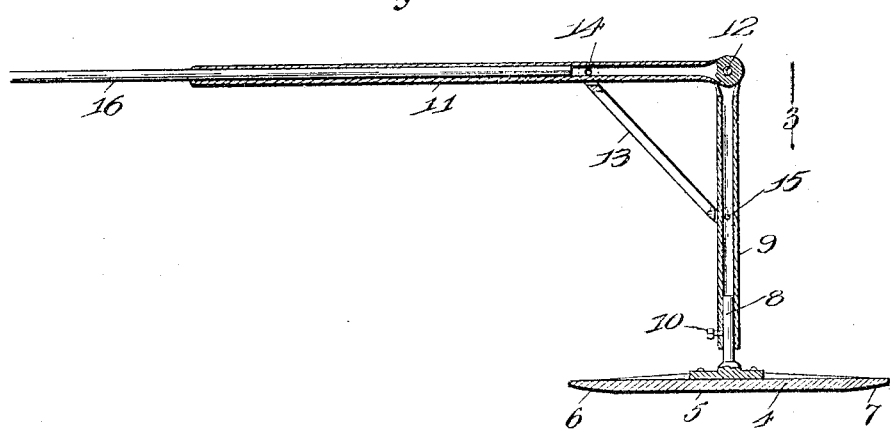
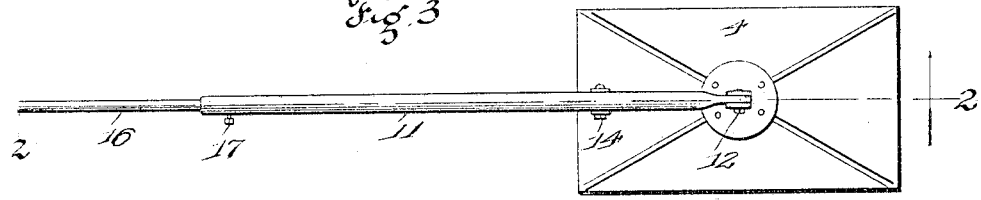
Witnesses
Alfred Eids
Edw M Barrington
Inventor
John C. Schottler
by Higdon Longan & Hopkins Attys

UNITED STATES PATENT OFFICE.

JOHN C. SCHOTTLER, OF ST. LOUIS, MISSOURI.

TOOL FOR SMOOTHING GRANITOID.

No. 801,611.     Specification of Letters Patent.     Patented Oct. 10, 1905.

Application filed January 9, 1905. Serial No. 240,281.

*To all whom it may concern:*

Be it known that I, JOHN C. SCHOTTLER, a citizen of the United States, and a resident of St. Louis, Missouri, have invented certain new and useful Improvements in Tools for Smoothing Granitoid, of which the following is a specification containing a full, clear, and exact description, reference being had to the accompanying drawings, forming a part hereof.

My invention relates to improvements in tools for smoothing granitoid; and it consists of the novel features herein shown, described, and claimed.

In the drawings, Figure 1 is a perspective of a tool for smoothing granitoid embodying the principles of my invention. Fig. 2 is a vertical central section on the line 2 2 of Fig. 3 and looking in the direction indicated by the arrow. Fig. 3 is a top plan view as seen looking in the direction indicated by the arrow 3 in Fig. 2.

Referring to the drawings in detail, the smoothing-tool 4 is rectangular in plan and has a finished smoothing-surface consisting of the flat central portion 5 and the rounded end portions 6 and 7, said end portions being in a line with the handle, so that the tool will rock as the handle is raised or lowered. The smoothing-tool 4 may be constructed of iron or wood or of any suitable material. The pintle 8 extends upwardly from the center of the tool at right angles to the body of the latter and is inserted into the lower end of the tubular post 9 and held in position by the set-screw 10. The rigid tubular handle 11 is hinged to the upper end of the post 9 by the pivot 12 and held rigid at right angles to the post by the brace 13, the ends of the brace being bifurcated to receive the post 9 and the handle 11, and pins 14 and 15 being inserted through the ends of the brace and through said post. The sliding handle 16 is a piece of pipe or rod slidingly mounted in the rigid tubular handle 11 and held in its adjusted position by the set-screw 17.

The tool is adapted for smoothing granitoid pavements, the idea being to provide a tool long enough so that the pavement may be smoothed by an operator standing upon the ground and not upon the green pavement.

The tools 4 may be of different forms and sizes and changed one for another by loosening the set-screw 10.

I claim—

1. A tool for smoothing granitoid comprising a suitable smoothing-tool; a pintle extending upwardly from the center of the tool; a tubular post adapted to receive the pintle in its lower end; a tubular handle extending at right angles from the upper end of the tubular post; a brace connecting the tubular handle to the post; and a second handle slidingly mounted in the tubular handle; substantially as specified.

2. A tool for smoothing granitoid comprising a suitable smoothing-tool; a pintle extending upwardly from the center of the smoothing-tool; a tubular post adapted to receive the pintle in its lower end; a tubular handle extending at right angles from the upper end of the tubular post; and a second handle slidingly mounted in the tubular handle; substantially as specified.

3. A tool for smoothing granitoid, comprising a suitable smoothing-tool; a pintle extending upwardly from the center of the smoothing-tool and at right angles to the body of the latter; a post adapted to receive the pintle in its lower end; means for holding the said post adjustably in position upon said pintle, and a handle extending rigidly from and at right angles to the post.

In testimony whereof I have signed my name to this specification in the presence of two subscribing witnesses.

JOHN C. SCHOTTLER.

Witnesses:
   ALFRED A. EICKS,
   JOHN C. HIGDON.